US012722362B2

(12) United States Patent
Tondu

(10) Patent No.: US 12,722,362 B2
(45) Date of Patent: Sep. 1, 2026

(54) GLAZED ASSEMBLY FOR AN AIRCRAFT, METHOD FOR MANUFACTURING SUCH A GLAZED ASSEMBLY AND AIRCRAFT COMPRISING SUCH A GLAZED ASSEMBLY

(71) Applicant: SAINT-GOBAIN GLASS FRANCE, Courbevoie (FR)

(72) Inventor: Thomas Tondu, Cavaillon (FR)

(73) Assignee: SAINT-GOBAIN SULLY, Sully-sur-Loire (FR)

( * ) Notice: Subject to any disclaimer, the term of this patent is extended or adjusted under 35 U.S.C. 154(b) by 0 days.

(21) Appl. No.: 18/836,468

(22) PCT Filed: Feb. 9, 2023

(86) PCT No.: PCT/EP2023/053249
§ 371 (c)(1),
(2) Date: Aug. 7, 2024

(87) PCT Pub. No.: WO2023/152256
PCT Pub. Date: Aug. 17, 2023

(65) Prior Publication Data

US 2025/0162289 A1 May 22, 2025

(30) Foreign Application Priority Data

Feb. 10, 2022 (FR) ...................................... 2201153

(51) Int. Cl.
*B32B 17/10* (2006.01)
*B32B 3/26* (2006.01)
(Continued)

(52) U.S. Cl.
CPC ........ *B32B 17/10293* (2013.01); *B32B 3/266* (2013.01); *B32B 17/10036* (2013.01);
(Continued)

(58) Field of Classification Search
CPC .............. B32B 17/10293; B32B 3/266; B32B 17/10036; B32B 17/10385; B32B 17/10938; B32B 2605/15; B64C 1/1492
See application file for complete search history.

(56) References Cited

U.S. PATENT DOCUMENTS 2,696,451 A * 12/1954 Snyder ..................... B60J 10/00 428/441
3,009,845 A 11/1961 Wiser
(Continued)

FOREIGN PATENT DOCUMENTS

WO WO-2025067869 A1 * 4/2025 ........... E06B 3/5436

OTHER PUBLICATIONS

International Search Report as issued in International Patent Application No. PCT/EP2023/053249, dated Apr. 13, 2023.

*Primary Examiner* — Philip J Bonzell
(74) *Attorney, Agent, or Firm* — CUSHMAN PARTNERS, LLC

(57) ABSTRACT

A glazed assembly for an aircraft, includes a laminated glazing having a first structural ply and a second structural ply bonded to the first structural ply by an adhesive interlayer. The glazed assembly also includes a retaining element, a first portion of which is fixedly inserted into at least the adhesive interlayer and a second portion of which extends the first portion outside of the glazing, a plurality of cleats arranged in respective cavities formed in the glazing in such a way that the cleats extend through the first portion and into each of the structural plies.

25 Claims, 7 Drawing Sheets

(51) Int. Cl.
*B64C 1/14* (2006.01)
*B64F 5/10* (2017.01)

(52) U.S. Cl.
CPC .. *B32B 17/10385* (2013.01); *B32B 17/10935* (2013.01); *B64C 1/1492* (2013.01); *B64F 5/10* (2017.01); *B32B 2307/7376* (2023.05); *B32B 2605/18* (2013.01)

(56) References Cited

U.S. PATENT DOCUMENTS

| | | | | |
|---|---|---|---|---|
| 5,270,518 | A | 12/1993 | Naoumenko et al. | |
| 8,714,487 | B2 * | 5/2014 | Yokoi | B32B 17/10174 244/129.3 |
| 8,851,423 | B1 | 10/2014 | Lewis et al. | |
| 9,598,166 | B2 * | 3/2017 | Yokoi | B64C 1/1492 |
| 2013/0026296 | A1 | 1/2013 | Yokoi | |
| 2014/0363254 | A1 | 12/2014 | Kondo | |

* cited by examiner

[Fig. 1]
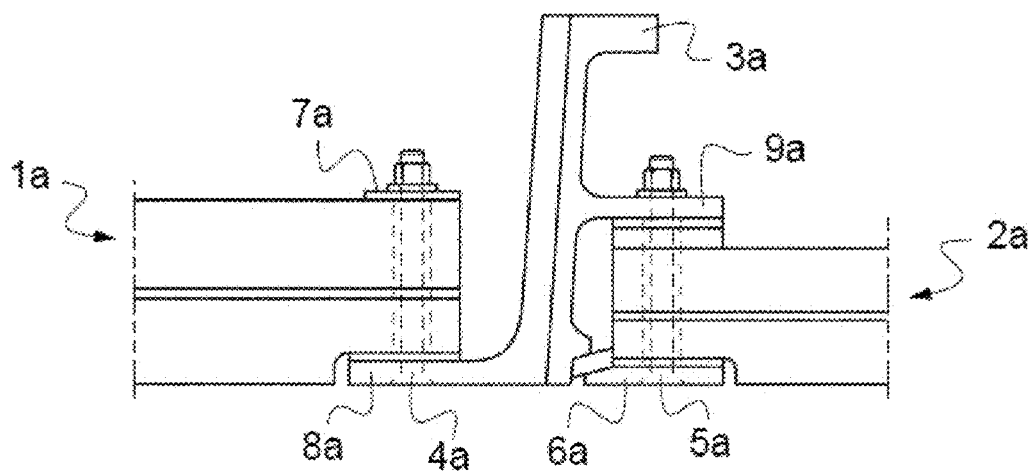
[Fig. 2]
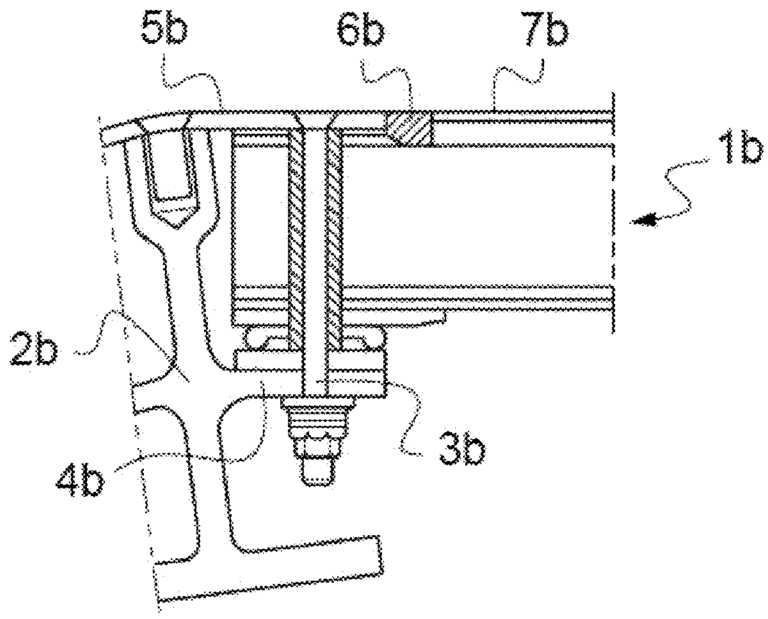

[Fig. 3]
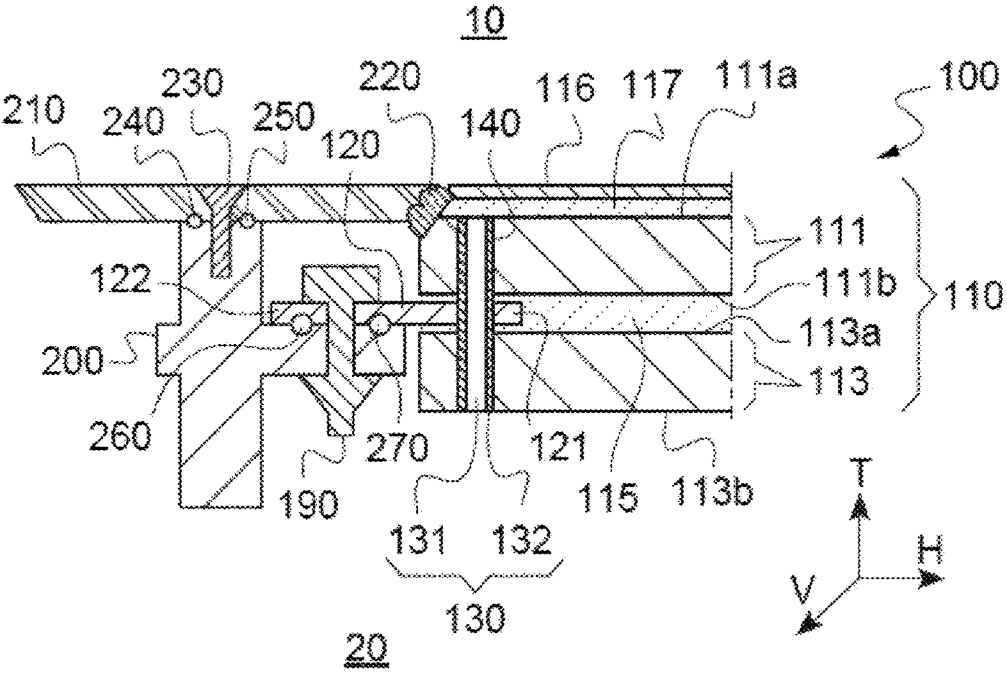
[Fig. 4]
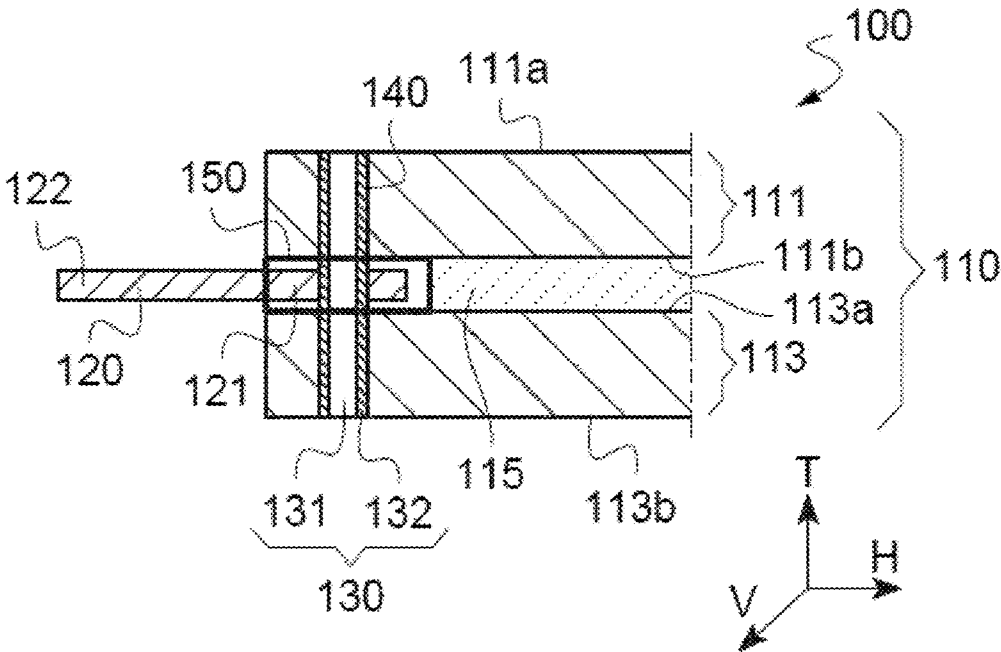

[Fig. 5]
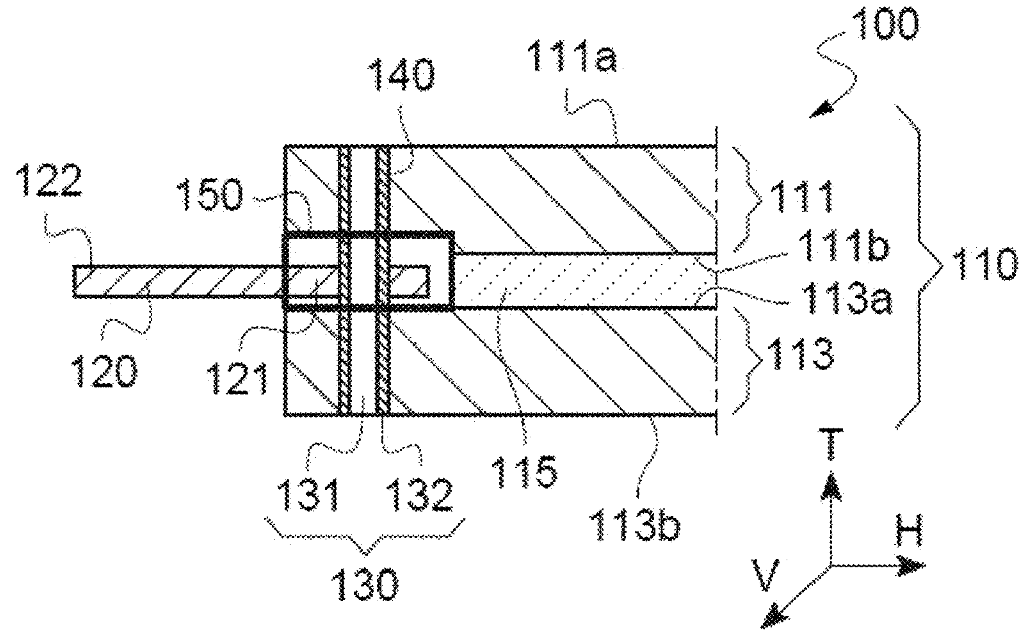
[Fig. 6]
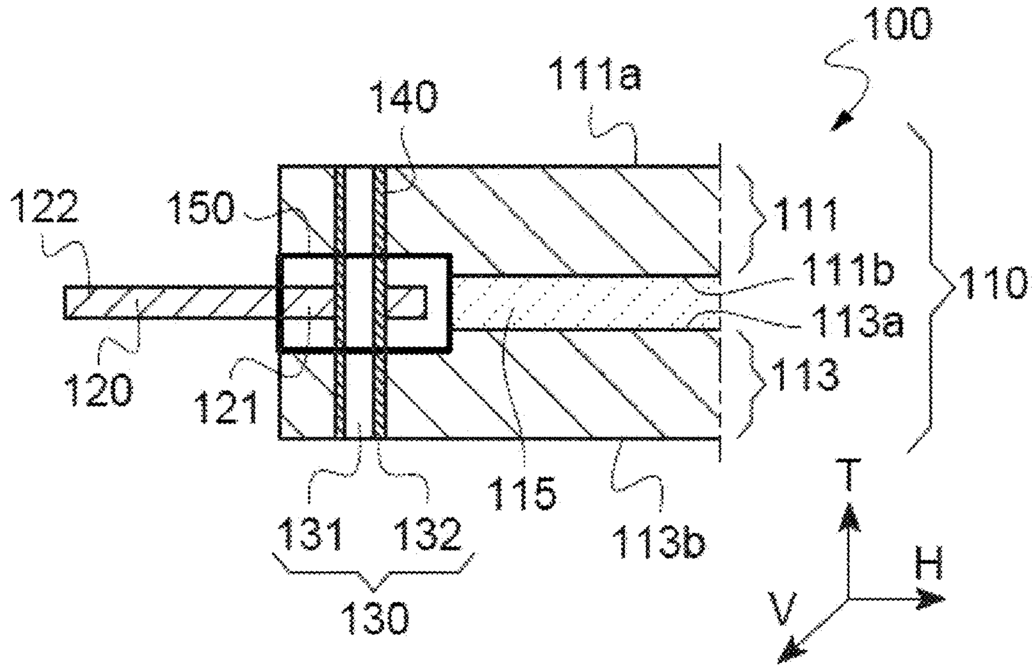

[Fig. 7]
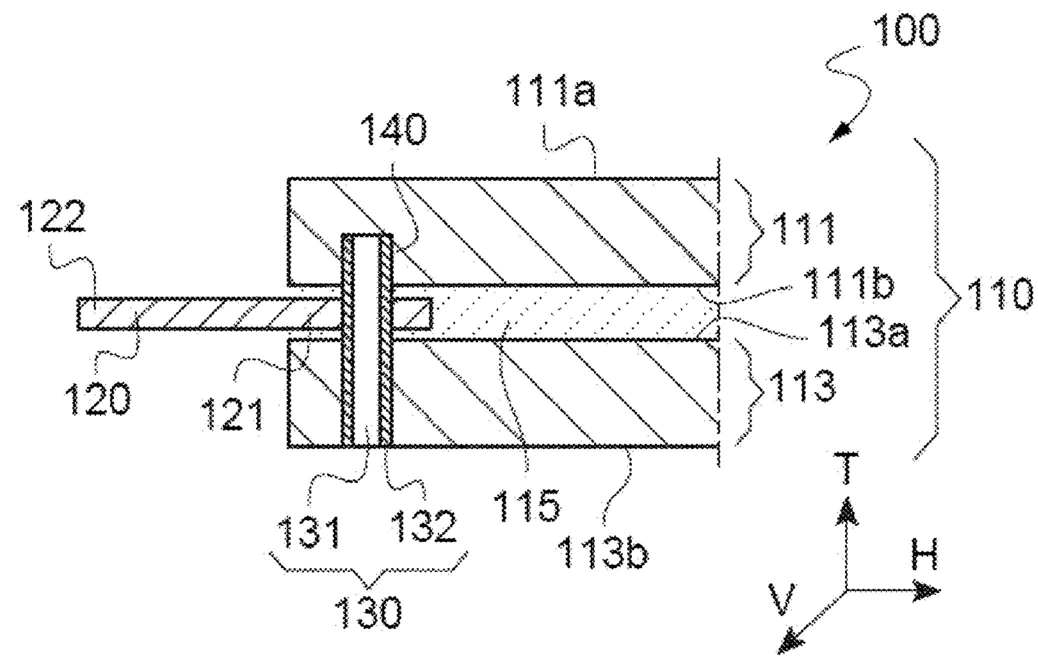
[Fig. 8]
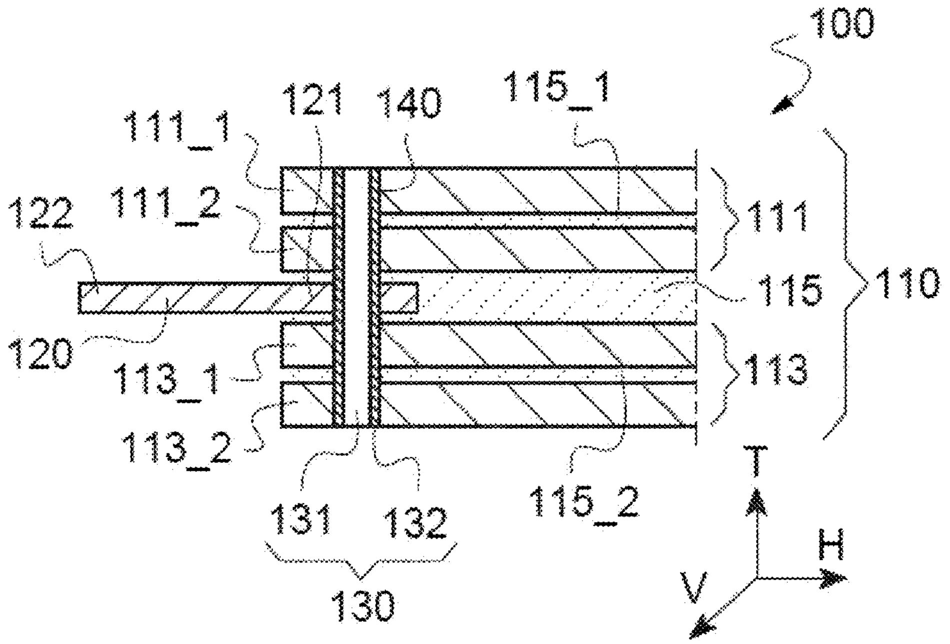

[Fig. 9]
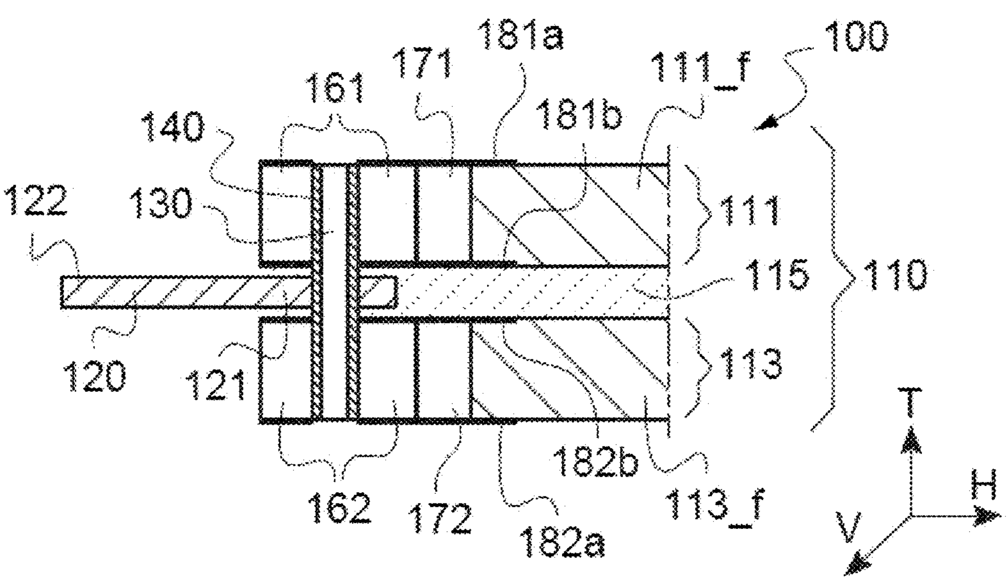
[Fig. 10]
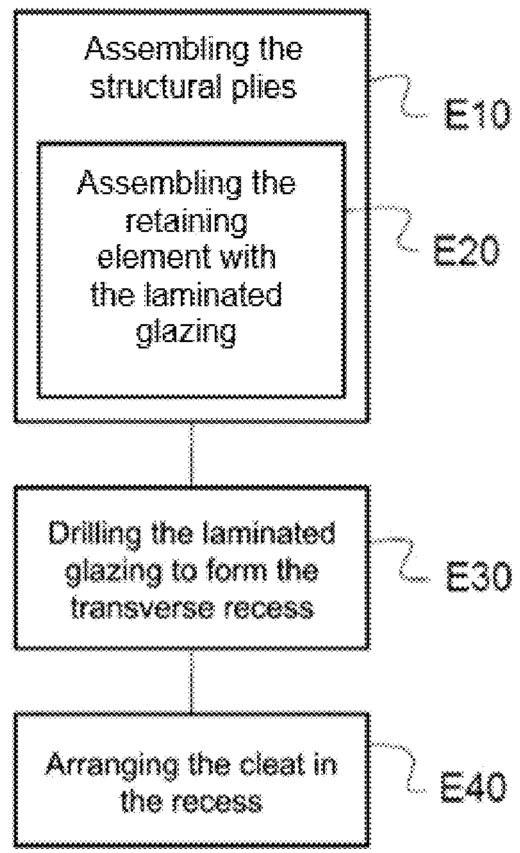

[Fig. 11]
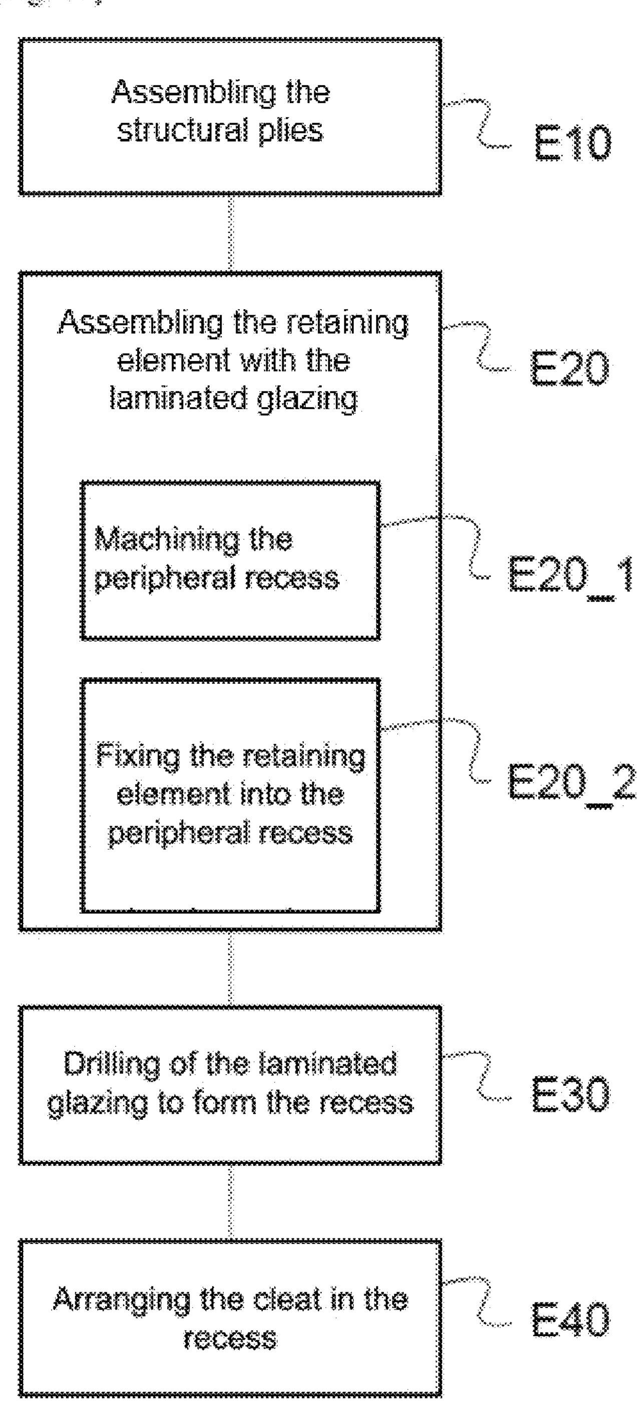

[Fig. 12]
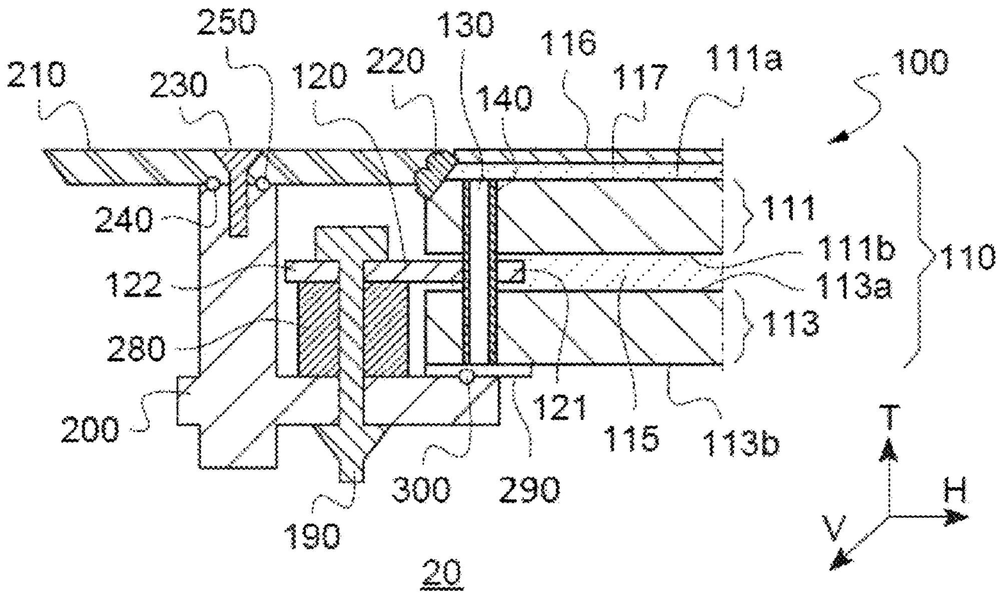
[Fig. 13]
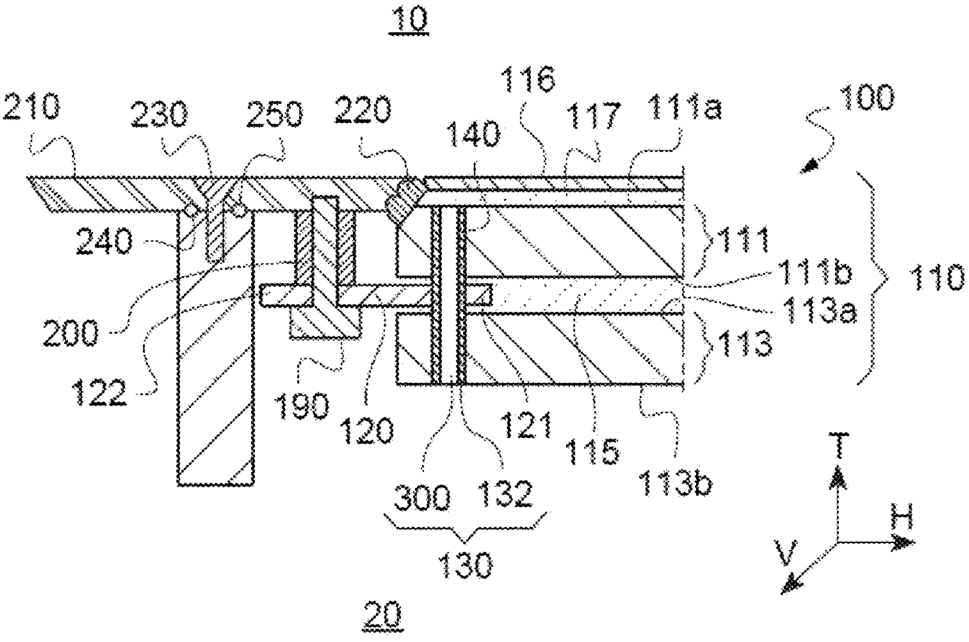

GLAZED ASSEMBLY FOR AN AIRCRAFT, METHOD FOR MANUFACTURING SUCH A GLAZED ASSEMBLY AND AIRCRAFT COMPRISING SUCH A GLAZED ASSEMBLY

CROSS-REFERENCE TO RELATED APPLICATIONS

This application is the U.S. National Stage of PCT/EP2023/053249, filed Feb. 9, 2023, which in turn claims priority to French patent application number 2201153 filed Feb. 10, 2022, The content of these applications are incorporated herein by reference in their entireties.

PRIOR ART

The present invention belongs to the general field of designing aeronautical glazing units. More specifically, it relates to a glazed assembly for an aircraft (that is intended to equip an aircraft). It also relates a method for manufacturing such a glazed assembly, as well as an aircraft equipped therewith. The invention has a particularly advantageous, though by no means limiting, application in the design of glazing units for commercial aircraft.

Aeronautical glazing units (cockpit glazing units, including front or "windshield" glazing units and side glazing units, but also cabin glazing units commonly known as portholes) for aircraft intended to be subjected to pressure differentials between an external environment (atmosphere) and the interior of said aircraft are laminated glazing made up of a plurality of structural plies, more particularly, and traditionally, at least two structural plies. In practice, yet another ply may be used in addition to said structural plies, whose contribution to the mechanical behavior of the glazing is not significant, but whose purpose is to ensure aerodynamic continuity as well as protection against certain conditions affecting the environment of the glazing (icing, abrasive conditions, hail, etc.).

"Structural ply of the glazing unit" conventionally refers to a rigid sheet constituting the laminated glazing capable of forming a monolithic glazing unit itself, to ensure the mechanical strength thereof, in particular, and having an elastic modulus at least equal to 1500 MPa for example.

To form the structural ply, such a sheet may optionally be completed by a heel and a shim arranged around the entire periphery of the sheet, at its edge, said shim also being positioned between the sheet and the heel; in this case, reference is made to a "structural bonding glazing" configuration.

Such a rigid sheet can either be a sheet of mineral glass, or a sheet of polymeric materials, typically PMMA (acronym for "polymethyl methacrylate") of aeronautical quality or PC (acronym for "polycarbonate").

In addition, the structural plies are joined together by layers of adhesive interlayer, for example, made of TPU (acronym for "thermoplastic polyurethane"), PVB (acronym for "polyvinyl butyral"), and so on. It should be noted that such adhesive interlayers are not configured to exhibit a minimum elastic modulus as previously indicated. As a result, an adhesive interlayer does not form a structural ply.

The overall design of an aircraft can be carried out in such a way as to make the glazing contribute significantly to the transmission of pressure forces experienced by said aircraft. For this purpose, aircraft glazing is "tensioned" on all sides. The glazing is also referred to as "membrane glazing", on the understanding that it must allow tangential stresses to flow through the aircraft's envelope (that is skin, hull or cabin).

Thus, the functional requirements a pressurized aeronautical glazing must meet include pressure resistance, which must be guaranteed not only when the glazing is intact (standard case) but also in the event of breakage of a structural ply of the glazing (a "failsafe"). In other words, breaking one of the plies must not result in loss of glazing or depressurization of the interior of the aircraft, for example, the cockpit.

Another functional requirement is the ability to withstand bird strikes.

Compliance with these two requirements depends on a number of factors, such as the thickness of the structural plies, but above all on the configuration of the attachment system used to connect the aircraft glazing to the aircraft structure.

Known fastening systems each comprise "external" retaining means in contact with the outer surface (that is facing the outside environment) of the glazing, and "internal" retaining means in contact with the inner surface (that is facing the inside of the aircraft) of the glazing. The function of each of these external and internal retaining means is to maintain and stabilize the glazing with respect to the pressure forces to which it is subjected, and to ensure at least partial sealing (water, air) of the aircraft interior.

Generally speaking, said internal and external retaining elements generally take the form of a screw/nut/washer (bolt) assembly, possibly supplemented by a metal strip (for example, made of aluminum a few millimeters thick), which can be connected directly or indirectly to the aircraft structure.

FIGS. 1 and 2 schematically illustrate two variants of attachment systems according to the prior art.

In the case of [FIG. 1], a first glazing unit 1*a* (on the left in [FIG. 1]) and a second glazing unit 2*a* (on the right in [FIG. 1]) are arranged on either side of an aircraft structural element 3*a*. More specifically, in this example [FIG. 1], said first and second glazing units 1*a*, 2*a* are cockpit side glazing units. Each glazing unit 1*a*, 2*a* is attached to this structural element 3*a* by means of a fastening system.

The attachment system for the first glazing unit 1*a* comprises a bolt 4*a* passing through the glazing unit from the outside to the inside of the aircraft. The head of the bolt 4*a* is attached through a protrusion 8*a* of the structural element 3*a*, said protrusion 8*a* being in contact with the external surface of the first glazing unit 1*a*. The assembly formed by the head of the bolt 4*a* and said protrusion 8*a* constitutes the external retaining means of said first glazing attachment system 1*a*. In addition, the nut and washer of bolt 4*a* are attached to a thin strip 7*a* in contact with the inner surface of first glazing unit 1*a*. The assembly formed by the nut, the washer and said thin strip 7*a* constitutes the internal retaining means of said attachment system for the first glazing unit 1*a*. Note that the screw head is attached directly to the aircraft structural element 3*a*. Conversely, the nut and washer are attached indirectly (via the glazing unit 1*a*) to said structural element 3*a* of the aircraft.

The attachment system for the second glazing unit 2*a* takes the form of a bolt 5*a*, substantially similar to that of the attachment system for the first glazing unit 1*a*. However, the bolt head of the bolt 5*a* (respectively the nut and washer of the bolt 5*a*) is here attached indirectly via a strip 6*a* (respectively directly, via a protrusion 9*a* of the structural element 3*a*) to the structural element 3*a*. The assembly formed by the bolt head 5*a* and said strip 6*a* (respectively by the nut, the washer and said protrusion 9*a*) constitutes the external retaining means (respectively the internal retaining means) of said attachment system for the second glazing unit 2*a*.

In [FIG. 2], a glazing unit 1*b* is used to at least partly form an aircraft windshield. The said glazing unit 1*b* is attached to a structural element 2*b* of the aircraft by means of an attachment system. The attachment system for the glazing unit 1*b* comprises a bolt 3*b*. The assembly formed by the bolt head 3*b* and a thin strip 5*b* constitutes the external retaining means of this attachment system. Furthermore, the assembly formed by the nut and washer of the bolt 3*b*, together with a protrusion 4*b* of the structural element 2*b* to which said nut and washer are attached, constitute the internal retaining means of this attachment system. Note that, in this case, the strip 5*b* is bolted directly to the structural element 2*b*.

Notably, other attachment systems exist. Thus, for example, in the case of pinched aeronautical glazing units (that is glazing units connected to the aircraft structure solely by pinching a peripheral joint of the glazing unit), it is customary to use an attachment system whose internal and external retaining elements are both fixed directly to the aircraft structure.

Although widely deployed today, the attachment systems described above are still far from being ideal solutions for meeting the functional requirements of aeronautical glazing.

In fact, the attachment system shown in [FIG. 1] causes the pressure forces created within the aircraft to pass through a single surface of the glazing (that is the outer surface of the first glazing unit 1*a* and the inner surface of the second glazing unit 2*a*), which has the effect of inducing:

- a torque in the attachment system that can lead to delamination failures,
- bending stresses on the attachment system, requiring thickening of this system and/or of at least one structural ply of the glazing unit (weight constraints and associated costs, particularly in the case of structural plies made of PMMA),
- highly asymmetrical force transmission, with stress singularities in the attachment system, limiting the ability to transmit diaphragm forces.

The attachment system in [FIG. 2], on the other hand, is capable of transferring the pressurization forces through both surfaces of the glazing unit in a more balanced way, which tends to compensate at least in part for the shortcomings of the attachment system in [FIG. 1]. However, the attachment system shown in [FIG. 2] is also very rigid when bending, which means that in the event of a bird strike close to the attachment system, the stresses in the glazing near the impact point are highly concentrated.

Furthermore, as is common to all known attachment systems, aerodynamic continuity is predominantly affected by the configuration of the external retaining means. For example, in the case of the glazing unit 1*a* in [FIG. 1], the moment induced by the asymmetrical bending load on the protrusion 8*a* causes it to thicken in comparison with the unloaded strip 6*a*. As a result, the first glazing unit 1*a* is thicker than the second glazing unit 2*a*, to ensure aerodynamic continuity between the first glazing unit 1*a* and the retaining means thereof.

Furthermore, in the case of a glazing unit with an anti-icing function (that is a glazing unit comprising a heated outer ply), in order to maximize the viewing area of the glazing unit, electrical elements for implementing said anti-icing function are positioned at the end of the transparent zone of the glazing unit (example: space 6*b* illustrated in [FIG. 2] and through which said electrical elements pass). This configuration means that the heating ply (for example, ply 7*b* illustrated in [FIG. 2]) cannot extend to the ends of the structural plies it protects. The result is a weak seal at the point where the external retaining means meet the outer surface of the glazing, which is problematic given the sensitivity of electrical components to moisture. Some prior art solutions propose to correct this weakness by introducing a "Z"-shaped element forming a barrier at said meeting point. However, in addition to creating an aerodynamic discontinuity, such a "Z"-shaped element is a metal element whose electrostatic charge must be managed, and which is expensive to produce.

OVERVIEW OF THE INVENTION

The aim of the present invention is to remedy some or all of the disadvantages of the prior art, in particular those set out above, by proposing a solution which makes it possible to obtain a glazed assembly capable of balancing the transmission of membrane pressure forces much more effectively than the solutions of the prior art, which greatly limits the risk of delamination, does not require the use of excessive structural ply thickness, complies with the "fail safe" requirement, is capable of ensuring aerodynamic continuity with the aircraft envelope, and is also particularly resistant to bird strikes, while being simple to manufacture and inexpensive.

To this end, and according to a first aspect, the invention relates to a glazed assembly for an aircraft, said glazed assembly comprising a laminated glazing comprising a set of structural plies including a first structural ply and a second structural ply fixed to the first structural ply via an interlayer. Said glazed assembly further comprises:

- a retaining element, a first portion of which is fixedly inserted in at least said interlayer at the edge of the laminated glazing and over at least a portion of its periphery, preferentially over the entire periphery of the laminated glazing, and a second portion of which extends the first portion outside of the laminated glazing,
- a plurality of cleats arranged in respective cavities formed in the laminated glazing so that said cleats extend substantially perpendicularly across the first portion of the retaining element and into each of said structural plies.

The advantage of having such cleats is that, in combination with the retaining element through which they extend, they smooth (that is distribute in a balanced manner) the membrane forces between all the plies making up the laminated glazing, this smoothing taking place evenly throughout the thickness of said plies. As a result, the permissible loads are considerably increased compared with the prior art, ensuring, in particular, very high resistance to pressure loads and bird strikes, as well as compliance with the "failsafe" requirement.

This also allows the membrane forces to be transmitted through the center of the laminated glazing.

In this way, the introduction of a bending moment at the periphery of the laminated glazing is avoided, thus greatly reducing the risk of delamination.

Moreover, by avoiding the occurrence of such a bending moment, and by homogenizing the transmission of forces between the structural plies, it is no longer necessary to use structural plies of different thicknesses, as is often the case in the prior art, particularly with plastic glazing, in order to increase bending stiffness and limit the risk of delamination. This makes it possible to use structural plies that are thinner than those generally used in the prior art, which not only helps to reduce the cost of producing the glazed assembly according to the invention, but also simplifies production, as thick structural plies are known to be complex to manufacture (for example, simplifying handling during mass production operations, limiting stretching processes for drawn PMMA and extrusion for PC, limiting shaping complexities).

Added to this is the fact that the presence of thick structural plies made of stretched PMMA is known to be detrimental to shear fractures of the stretching plane of said plies (particularly weak compared to other cracking directions). As a result, the invention also reduces the risk of such ruptures occurring, particularly in the event of bird strikes.

What's more, since a greater number of thinner structural plies can be used in place of thicker plies, the "fail safe" requirement can be further reinforced.

Another important aspect of the invention is that an external retaining element is no longer required, compared with solutions based on the prior art. This results in a number of advantages:

- ease of ensuring aerodynamic continuity without creating a zone of low airtightness in the aircraft envelope, and therefore no need for a "Z"-shaped element,
- the possibility of taking advantage of a greater length of external glass, in particular external glass supporting an anti-icing function, which, for example, provides greater leeway for positioning the supply electrodes of an anti-icing system outside the cockpit viewing area,
- in the case where a glass sheet coated with a heating layer is used (see below), minimizing the thickness of the interlayer enabling this glass sheet to be attached to the first structural ply, which is advantageous with regard to the threat of hail.

Another important aspect of the invention is that the glazed assembly according to the invention avoids the need for pinch-fitting. In other words, attaching the glazed assembly to the aircraft structure does not compress the laminated glazing. This advantageously eliminates the faults inherent in pinch-fitting, such as peripheral creep problems (interlayer flow outside the laminated glazing, irreversible joint compression, etc.) which are particularly responsible for loss of sealing, bubbling due to interlayer depression, optical degradation due to the structural plies losing their parallel nature, etc.

The retaining element is configured to attach the laminated glazing to the aircraft and in particular to an internal structure of the aircraft.

In particular embodiments, the glazed assembly may further comprise one or more of the following features, taken alone or in any technically feasible combinations.

In particular embodiments, at least one cleat comprises a body made of a metallic material, for example titanium or steel.

In particular embodiments, at least one cleat comprises a sleeve peripheral to said body and made of an elastic material, for example elastomer.

The use of such a peripheral sleeve is advantageous in that it contributes even more to the smoothing of membrane forces between all the plies making up the laminated glazing. Furthermore, if a plurality of cleats are equipped with respective peripheral sleeves, said smoothing of forces also takes place between these cleats.

In particular embodiments, the retaining element is made of a metallic material, for example, titanium, aluminum or stainless steel, or is made of a composite material, for example, a carbon-or glass-fiber-reinforced composite material.

In particular embodiments, at least one cleat is arranged in the associated cavity with a clearance.

In this way, it is possible to have a degree of rotational freedom for the cleat inside the cavity wherein it is placed, which not only further promotes the uniform distribution of membrane forces on the structural plies, but also avoids the appearance of a bending moment likely to create a delamination problem (said bending moment refers to a stress on the laminated glazing linked to rotation with respect to the plane wherein the retaining element extends).

In particular embodiments, said set of structural plies comprises at least three structural plies, for example four structural plies, preferentially four structural plies distributed in pairs on either side of the retaining element, with an interlayer arranged between each pair of structural plies.

As mentioned above, having more than two structural plies further strengthens compliance with the "failsafe" requirement.

In particular embodiments, the structural plies have identical thicknesses, or at least two structural plies have different thicknesses.

In particular embodiments, at least one cavity accommodating a cleat is strictly included in the laminated glazing, either opening through a single structural ply, or opening through all structural plies.

In particular embodiments, when said at least one cavity is open through all structural plies, the cleat body arranged in said at least one cavity is hollow.

Such arrangements are advantageous in that they allow the transmission of electrical elements (heaters, sensors, etc.) through the thickness of the laminated glazing.

In particular embodiments, the glass sheet of a structural ply is made of mineral glass or organic glass.

In particular embodiments, each interlayer is an adhesive layer made of thermoplastic polyurethane (TPU), polyvinyl butyral (PVB), ethylene-vinyl acetate copolymer (EVA), ionomer resin or casting resin.

In particular embodiments, the laminated glazing further comprises a glass sheet coated with a heating layer, intended to be in contact with the external environment and attached to the set of structural plies via an adhesive interlayer.

Such a heated glass sheet is advantageous in that it protects the laminated glazing from frost, and also provides additional protection for the set of structural plies from splashes of sand, gravel, wiper scratches and so on.

In particular embodiments, the first portion of the retaining element is embedded in the interlayer, via which the first structural ply is bonded to the second structural ply.

In particular embodiments, the first portion of the retaining element is fixed by bonding into a peripheral recess machined in said interlayer, or even in at least one of said first and second structural plies, for example symmetrically in said first and second structural plies.

The advantage of these arrangements is that the peripheral recess can be produced once the laminated glazing has been fully assembled. In other words, unlike the case where the first portion of the retaining element is embedded in the interlayer, it is not necessary here to consider fixing said first portion at the laminated stage of the glazed assembly.

In particular embodiments, the glass sheets of the structural plies are made of polymeric material, the cavities being arranged in said glass sheets.

In particular embodiments, the glass sheets of the structural plies are made of mineral glass, each structural ply comprising:

- a heel made of composite material and a shim made of flexible material, the heel and shim being arranged around the entire periphery of the glass sheet at its edge, said shim also being positioned between the glass sheet and the heel,
- inserts made of composite material, arranged on either side of the structural ply and fixed against the heel, the shim and part of the glass sheet.

Furthermore, the cavities extend through the heels as well as the inserts, the retaining element being embedded in the interlayer via which the first structural ply is bonded to the second structural ply.

In particular embodiments, the second portion of the retaining element is a part for attaching the laminated glazing to an internal structure of the aircraft. In other words, the second portion of the retaining element extending the first portion outside the laminated glazing is configured for attachment to an internal structure of the aircraft.

The second portion of the retaining element is designed to be attached to an internal structure of the aircraft by means of a fastening system.

According to a second aspect, the invention relates to a method for manufacturing a glazed assembly according to the invention. Said method comprises steps of:

- assembling the structural plies to each other to form said laminated glazing,
- assembling the retaining element with said laminated glazing, so that said first portion is fixedly inserted in at least said interlayer by means of which the first structural ply is fixed to the second structural ply, at the edge of the laminated glazing as well as over its entire periphery, and so that said second portion extends the first portion outside the laminated glazing,
- drilling the laminated glazing and the retaining element to form said cavities,
- arranging said cleats in said cavities.

In particular embodiments, the manufacturing method may further include one or more of the following features, taken in isolation or according to any of the technically possible combinations.

In particular embodiments, the step of assembling the retaining element with the laminated glazing is carried out during the step of assembling the first and second structural plies to each other, by embedding the first portion of the retaining element in the interlayer via which the first structural ply is attached to the second structural ply.

In particular embodiments, the step of assembling the retaining element with the laminated glazing is carried out once the step of assembling the first and second structural plies to each other has been completed, and comprises:

- machining of a peripheral recess in said interlayer, or even in at least one of said first and second structural plies, for example symmetrically in said first and second structural plies,
- bonding the first portion of the retaining element into said peripheral recess.

According to a third aspect, the invention relates to an aircraft comprising a glazed assembly according to the invention arranged in aerodynamic continuity with the envelope of said aircraft, the second portion of the retaining element, called the "attachment part", being fixed to the internal structure of the aircraft.

In particular embodiments, the aircraft may further comprise several of the following features, taken alone or in any technically feasible combinations.

In particular embodiments, the attachment part is fixed to a so-called "support" part of the aircraft's internal structure, said support part being arranged facing the edge of the laminated glazing, said attachment part being arranged between the aircraft's envelope and said support part.

In particular embodiments, the attachment part is fastened to a so-called "support" part of the internal structure of the aircraft, said support part being arranged at a distance from the second structural ply towards the interior of the aircraft, said attachment part being arranged between the aircraft envelope and said support part, the attachment part being secured by means of a shim positioned between said attachment part and the support part, a contact element made of a material more ductile than glazing also being inserted between the support part and the second structural ply.

In particular embodiments, the attachment part is fixed to a so-called "support" part of the aircraft's internal structure, said support part being arranged between the aircraft's envelope and said attachment part.

BRIEF DESCRIPTION OF THE DRAWINGS

Other features and advantages of the present invention will emerge from the non-limiting description given below, with reference to the appended drawings that illustrate an exemplary embodiment thereof. In the figures:

FIG. 1 schematically shows a variant of an attachment system according to the prior art;

FIG. 2 schematically shows another variant of an attachment system according to the prior art;

FIG. 3 schematically shows, in its environment, a particular embodiment of a glazed assembly according to the invention as well as a particular way of attaching said glazed assembly to the structure of an aircraft;

FIG. 4 schematically shows another embodiment of the glazed assembly;

FIG. 5 schematically shows another embodiment of the glazed assembly;

FIG. 6 schematically shows another embodiment of the glazed assembly;

FIG. 7 schematically shows another embodiment of the glazed assembly;

FIG. 8 schematically shows another embodiment of the glazed assembly;

FIG. 9 schematically shows another embodiment of the glazed assembly;

FIG. 10 shows, in flowchart form, a particular method of implementing a method for manufacturing the glazed assembly shown in FIG. 3;

FIG. 11 shows, in flowchart form, a particular method of implementing a method for manufacturing the glazed assembly shown in FIG. 4;

FIG. 12 schematically shows another particular way of attaching the glazed assembly of FIG. 3 to the aircraft structure;

FIG. 13 schematically shows another particular way of attaching the glazed assembly of FIG. 3 to the aircraft structure.

DESCRIPTION OF EMBODIMENTS

[FIG. 3] schematically shows, in its environment, a particular embodiment of a glazed assembly 100 according to the invention.

In the remainder of the description, the horizontal, vertical, and transverse directions will be used without limitation in reference to the axis system (H, V, T) shown in [FIG. 3]. Also, the glazed assembly 100 of [FIG. 3] is shown in cross-section (that is within the thickness of said glazed assembly 100).

By convention, the terms "upper" and "lower" or "top" and "bottom" or "above" and "below" are used in reference to the transverse orientation. The terms "left" and "right" are used to refer to horizontal orientation.

In [FIG. 3], the glazed assembly 100 is shown as already integrated (attached) to an aircraft. The remainder of the description is aimed more specifically at a commercial aircraft, also known simply as an "airplane". However, the invention can be applied, without limitation, to any type of aircraft designed to be subjected to pressure differentials between an external environment 10 and the interior 20 of said aircraft, such as a cargo aircraft, a fighter aircraft, a helicopter, and so on.

For the rest of the description, it is assumed that the glazed assembly 100 is part of the cockpit glazing of said commercial aircraft, more specifically the windshield of this cockpit glazing. However, such arrangements are not a limitation of the invention, and there is nothing to preclude the possibility of the glazed assembly 100 forming part of another cockpit window, such as a side window of the cockpit (that is a part less exposed to the risk of bird strike than the windshield), or forming part of a cabin glazing, such as a porthole.

Firstly, we will describe the detailed configuration of the glazed assembly 100 alone as implemented in the embodiment shown in [FIG. 3], as well as several variants of this embodiment. Secondly, we will describe how the said glazed assembly 100 is integrated into the aircraft by being fixed (that is secured) to its structure.

In the present embodiment, the glazed assembly 100 comprises a laminated glazing 110. Said laminated glazing 110 comprises a set of structural plies including a first structural ply 111 as well as a second structural ply 113 bonded to the first structural ply 111 via an adhesive interlayer 115.

In particular, and as illustrated in [FIG. 3]:

- the first structural ply 111 is a sheet of glass facing the aircraft's external environment. Said glass sheet 111 comprises an upper face 111*a* and a lower face 111*b;*
- the second structural ply 113 is a glass sheet bonded to the first structural ply 111 by means of said adhesive interlayer 115. Said glass sheet 113 comprises an upper face 113*a* and a lower face 113*b*.

It is therefore understood that the adhesive interlayer 115 is arranged between the lower face 111*b* of the glass sheet 111 and the upper face 113*a* of the glass sheet 113.

Said glass sheets 111, 114 are made of organic glass, more particularly, in the embodiment described here, of stretched polymethyl methacrylate (stretched PMMA).

However, there's no reason why another polymer material shouldn't be considered, such as unstretched polymethyl methacrylate, polycarbonate (PC), polyethylene terephthalate (PET) or polyurethane (PU).

The adhesive interlayer 115 is made of thermoplastic polyurethane, polyvinyl butyral, ethylene-vinyl acetate copolymer ("EVA" in the relevant technical literature), ionomer resin or casting resin. These provisions also apply to any other adhesive interlayer described below.

It should be noted that, in the present embodiment, said set of structural plies comprises only the first structural ply 111 and the second structural ply 113. Considering such a set of structural plies is, however, only one variant of the invention. This does not preclude the possibility of considering other embodiments wherein the said set of structural plies comprises at least three structural plies, for example four structural plies, preferentially four structural plies distributed in pairs on either side of a retaining element, as will be described later in the context of another variant of the glazed assembly.

In the embodiment described here, the first and second structural plies 111, 113 have identical thicknesses (the thickness of a structural ply being counted in the transverse direction T, and corresponding here, for this embodiment, to the thickness of the glass sheets). For example, the thickness of said first and second structural plies 111, 113 is between 3 mm and 25 mm.

However, this does not preclude other designs wherein, for example, the first structural ply 111 has a different thickness (that is greater or lesser) than the second structural ply 113. By way of example, the thickness of the first structural ply 111 is 16 mm, while the thickness of the second structural ply 113 is 12 mm.

Furthermore, and as illustrated in [FIG. 3], the laminated glazing 110 further comprises a glass sheet 116 coated with a heating layer, in contact with the external environment 10 and attached to the first structural ply 111 via an adhesive layer 117. Such a glass sheet 116 is advantageous in that it protects the laminated glazing 110 from frost, and also provides additional protection for the first structural ply 111 from splashes of sand, gravel, wiper scratches and so on.

The use of such a glass sheet 116, apart from being optional, is well known to those skilled in the art, so it is not further detailed here. It should also be noted that said glass sheet 116 does not form a structural ply in the sense of the invention, but rather a thin outer ply.

In accordance with the invention, and as illustrated in [FIG. 3], the glazed assembly 100 further comprises a so-called "retaining element 120" and a plurality of cleats 130.

The retaining element 120 is configured to attach the laminated glazing 110 of the glazed assembly 100 to the aircraft and in particular to attach the laminated glazing 110 to an internal structure of the aircraft.

The retaining element 120 comprises a first portion 121 which is fixedly (that is, non-removably) inserted into the adhesive interlayer 115 at the edge of the laminated glazing 110 and around the entire periphery of said laminated glazing 110.

In other words, said first portion 121 (and therefore as such also the entire retaining element 120) forms a frame, which from a geometric point of view means that, in the plane (V, H) of [FIG. 3], said first portion 121 corresponds to a doubly connected domain (that is a surface domain with one hole).

The retaining element also comprises a second portion 122 which extends the first portion 121 outside the laminated glazing 110. In other words, similar to what was mentioned above, said second portion 122 also takes the form, in the plane (V, H) of [FIG. 3], of a doubly connected domain.

The second portion 122 of the retaining element 120 is configured to be attached to an internal structure of the aircraft, in particular the second portion 122 is configured to be attached to said internal structure of the aircraft by means of a fastening system.

The second portion 122 of the retaining element forms a part for attaching the retaining element to said internal structure of the aircraft.

As can be seen from [FIG. 3], said second portion 122 is bolted to the internal structure of the aircraft, so that the term "attachment part 122" is also used to designate said second portion 122 in the remainder of the description. These aspects will be described in greater detail later, but it can already be understood that the retaining element 120 can be described as "internal" in the sense that it is attached to the laminated glazing 110 at a surface (edge) positioned within the interior 20 of the aircraft, to be deployed only within said interior 20.

More particularly, in the embodiment shown in [FIG. 3], the retaining element 120 extends substantially flat in the mean plane of the laminated glazing 110 and substantially parallel to the first and second structural plies 111, 113. Furthermore, the first portion 121 of the retaining element 120 is here embedded (that is fully contained) in the adhesive interlayer 115.

It should be noted that to obtain such a configuration of the first portion 121 (that is embedded in the layer 115), it is advisable to consider assembling together the retaining element 120 with the laminated glazing 110 during an assembly (that is laminating) step of said laminated glazing 110. These aspects are also described in more detail later with reference to a manufacturing method according to the invention of said glazed assembly 100.

Different materials can be used to make the retaining element 120. Thus in one example, the retaining element 120 is made of a metallic material such as titanium, aluminum or stainless steel.

In another embodiment, the retaining element 120 is made of a composite material, such as a carbon or glass fiber-reinforced composite.

Although it is considered in the embodiment described here that the retaining element 120 is fixedly inserted (via said first portion 121) into the adhesive interlayer 115 over the entire periphery of said laminated glazing 110, other variants remain conceivable, in particular so that said insertion takes place only over a portion of the periphery of said laminated glazing 110 (in which case, of course, the retaining element 120 no longer takes the form of a frame).

Furthermore, regardless of whether the retaining element 120 is inserted over all or part of the periphery of laminated glazing 110, said retaining element can be made from one piece or, alternatively, from several pieces joined together, possibly with overlap. Furthermore, if the retaining element 120 is inserted only on a portion of the periphery of the laminated glazing 110, said retaining element 120 can be made from several parts, some of said parts being able to be disjointed from one another.

It is also assumed in the present embodiment that the second portion 122 is bolted to the aircraft structure. However, such arrangements do not limit he invention, and any suitable fastening means known to the skilled person can of course be envisaged (for example: gluing).

Furthermore, for simplicity's sake, the description of the embodiment shown in [FIG. 3] now refers to a single cleat 130. It is important to note, however, that the technical features now described apply to all or some of the cleats 130 fitted to the glazed assembly 100. What's more, the cleats 130 can be distributed in different ways along the periphery of the laminated glazing 110, for example uniformly, in an even more particular example every 5 cm.

The cleat 130 illustrated in [FIG. 3] is arranged in a cavity 140 made in the laminated glazing 110 so that said cleat 130 extends substantially perpendicularly through the first portion 121 of the retaining element 120 as well as into (that is inside) both the first and second structural plies 111, 113. As a result of these arrangements, and of the configuration of the retaining element 120, both the cleat 130 and the cavity 140 extend in the transverse direction T substantially perpendicular to the top face 111*a* and bottom face 113*b* belonging to the first and second structural plies 111, 113 respectively.

Having such a cleat 130 is particularly advantageous in that, in combination with the retaining element 120 through which it extends, it smoothes (that is distributes in a balanced manner) the membrane forces between all the plies entering into the composition of the laminated glazing 110, but also allows the membrane forces to pass through the center of the laminated glazing 110. This prevents the introduction of a bending moment at the periphery of the laminated glazing 110, thus limiting the bending which, in the prior art, is at the origin of delamination mechanisms.

More particularly, in the embodiment shown in [FIG. 3], the cleat 130 comprises a body 131 made of a metallic material, for example titanium or steel, and a sleeve 132 peripheral to said body 131 and made of an elastic material, for example elastomer (the sleeve 132 is hatched in [FIG. 3]).

It is important to note that the use of such a peripheral sleeve 132 is optional within the meaning of the present invention, and that it advantageously contributes even more to the smoothing of membrane forces between all the plies involved in the composition of the laminated glazing 110. Furthermore, other materials can be considered for the body 131 of the cleat 130, such as ceramic or a low-carbon composite material.

Furthermore, in the present embodiment, the cleat 130 is inserted into the cavity 140 without clearance. "Clearance" here is course referring here to a free space counted in the plane orthogonal to the direction wherein the cleat 130 extends.

Considering such insertion without clearance is, however, only one variant of the invention. Thus, there is no reason why cavity 140 and cleat 130 cannot be dimensioned so that there is clearance between them (not shown in the figures). In this way, it is possible to have a degree of rotational freedom for the cleat 130 inside the cavity 140, and thus ultimately between the cleat 130 and the retaining element 120, which not only further promotes the uniform distribution of membrane forces on the structural plies 111, 113, but also avoids the appearance of a bending moment likely to create a delamination problem.

In the embodiment described here, and as illustrated in [FIG. 3], the cavity 140 is open through said first and second structural plies 111, 113. In other words, the transverse recess 140 opens out at the upper face 111*a* of the first structural ply 111, as well as at the lower face 113*b* of the second structural ply 113.

Note that the cleat 130 is the same size as the cavity 140 in direction T (in other words, the length of the cleat 130 is the same as the thickness of the laminated glazing 110). It is, of course, still possible to envisage variants wherein the size of said cleat 130 is smaller or larger than that of the cavity 140 in direction T, as long as said cleat 130 extends through the first portion 121 of the retaining element 120 and into each of said structural plies 111, 113.

Advantageously, in addition to the fact that cavity 140 is open through said first and second structural plies 111, 113, the body 131 of cleat 130 is hollow. Such arrangements enable the transmission of electrical elements (power supply wires for a heating system, sensor connection wires, etc.) through the thickness of laminated glazing 110.

It is nevertheless understood that considering a hollow 131 body is only one variant of the invention, and nothing of course excludes the possibility of considering a solid body.

The glazed assembly 100 has so far been described in relation to the embodiment shown in [FIG. 3]. However, the invention still covers other embodiments, which are now described and illustrated, before describing how the glazed assembly 100 shown in [FIG. 3] is attached to the aircraft structure. Note that for these other embodiments, and in comparison with [FIG. 3], only the glazed assembly 100 is shown. Furthermore, and solely for the sake of simplicity, the heating fold 116 and the adhesive layer 117 are omitted.

Schematically, [FIG. 4] illustrates another embodiment of the glazed assembly 100.

The design shown in [FIG. 4] incorporates all the features of the design shown in [FIG. 3], with the difference that instead of the first portion 121 of the retaining element 120 being embedded in the adhesive interlayer 115 (during the assembly stage of the laminated glazing 110), said first portion 121 is now fixed by bonding in a peripheral recess 150 machined in said adhesive interlayer 115 (that is on the edge of the laminated glazing 110).

The advantage of these arrangements is that the peripheral recess 150 can be produced once the laminated glazing 110 has been fully assembled. In other words, unlike the case where the first portion 121 of the retaining element 120 is embedded in the interlayer 115, it is not necessary here to consider fixing said first portion 121 at the laminated stage of the glazed assembly 110.

It should be noted that the peripheral recess 150 is only machined in the adhesive interlayer 115. However, other variants are also possible, as illustrated in FIGS. 5 and 6.

Thus, in [FIG. 5], the peripheral recess 150 is machined in the adhesive interlayer 115 and in the first structural ply 111 only.

Of course, it is also possible to envisage that the peripheral recess 150 is machined in the adhesive interlayer 115 as well as in the second structural ply 113 alone.

In [FIG. 6], the peripheral recess 150 is machined into the adhesive interlayer 115 and symmetrically into said first and second structural plies 111, 113.

Here too, it is understood that the peripheral recess 150 can be machined in said first and second structural plies 111, 113 without this machining being symmetrical.

Schematically, [FIG. 7] illustrates yet another embodiment of the glazed assembly 100.

The design shown in [FIG. 7] incorporates all the features of the design shown in [FIG. 3], with the difference that the cavity 140 is open only through the second structural ply 113 (that is only through the lower face 114*b*).

However, this does not preclude other embodiments wherein the cavity 140 is open only through the first structural ply 111, or even embodiments wherein the cavity 140 is strictly included in the laminated glazing unit (that is the cavity 140 does not open through any structural ply 111, 113).

Schematically, [FIG. 8] illustrates yet another embodiment of the glazed assembly 100.

The embodiment shown in [FIG. 8] has all the features of the embodiment shown in [FIG. 3] except that the set of structural plies here comprises four structural plies 111_1, 111_2, 113_1, 113_2 distributed in pairs on either side of the retaining element 120, with an adhesive interlayer 115_1, 115_2 arranged between each pair of structural plies (these layers 115_1, 115_2 are used in addition to the layer 115 for bonding between the structural plies 111, 113).

Note that not all structural plies are necessarily made from the same material. Thus, configurations can be envisaged wherein the outermost plies 111_1, 113_2 with respect to the retaining element 120 are made of stretched PMMA, while the middle plies 111_2, 113_1 are made of PC, which performs better against bird strikes.

It has also been assumed up to now that the glass sheets of the structural plies are made of polymer material. However, the invention also applies in the case where said glass sheets are made of mineral glass, for example soda-lime, aluminosilicate, borosilicate, thermally toughened or chemically strengthened glass, as illustrated in [FIG. 9]. It should be noted that in the embodiment shown in [FIG. 9], the structural plies 111, 113 are no longer limited to said glass sheets, but also include other elements. Consequently, the glass sheet of the first structural ply 111 (respectively of the second structural ply 113) bears the reference "111_*f*" (respectively the reference "113_*f*") for this embodiment.

Thus, and as illustrated in [FIG. 9], the first structural ply 111 comprises:

- a heel 161 made of composite material, for example reinforced with glass or carbon fibers, and a shim 171 made of flexible material, preferentially viscoelastic material. The heel 161 and the shim 171 are arranged around the entire periphery of the glass sheet 111_*f* at its edge, said shim 171 also being positioned between the glass sheet 111_*f* and the heel 161,
- inserts 181*a*, 181*b* made of composite material, for example, glass fiber or titanium sheet, arranged on either side of said first structural ply 111 and secured to the heel 161, the shim 171 and part of the glass sheet 111_*f*, for example, by bonding.

As illustrated in [FIG. 9], the second structural ply 113 is configured similarly to the first structural ply 111, and for this purpose comprises a heel 162 and a shim 172, as well as inserts 182*a*, 182*b*.

Furthermore, in the embodiment shown in [FIG. 9], cavity 140 (and therefore as such the cleat 130) extends through heels 161, 162 and inserts 181*a*, 181*b*, 182*a*, 182*b*. The retaining element 120, meanwhile, is embedded in the adhesive interlayer 115.

It should also be noted that, in the example shown in [FIG. 9], the cavity 140 is open through the first and second structural plies 111, 113 (that is through the insert 181*a* and/or through the insert 182*b*). However, as explained above, it is entirely possible to envisage the cavity 140 opening through just one of the said structural plies 111, 113, or else being strictly included in the laminated glazing 110.

It should also be noted that the use of heels 161, 162, shims 171, 172 and inserts 181*a*, 181*b*, 182*a*, 182*b* refers to a prior art configuration known as "structural bonding glazing". However, unlike the latter, the configuration in [FIG. 9] makes no use of external retaining elements.

The role of inserts 181*a*, 181*b*, 182*a*, 182*b* is to transmit forces between heels 161, 162 and structural plies 111, 113. The shims 171, 172 are used to compensate, over a distance typically on the order of a centimeter, for any deviations in shape between heels 161, 162 and glass sheets 112, 114 (said deviations in shape typically resulting from hazards in the implementation of manufacturing methods for heels 161, 162 and glass sheets 111_*f*, 113_*f*). The shims 171, 172 are also used to prevent any creep of composite resins from inserts 181*a*, 181*b*, 182*a*, 182*b* or of the glue used to attach them.

The inserts 181*a*, 181*b*, 182*a*, 182*b* are separate from the retaining elements.

Finally, it is important to note that all the embodiments described above (FIGS. 3 to 9) can be combined in any technically feasible way.

As already mentioned, the invention also relates to a method for manufacturing the glazed assembly 100. The manufacturing method can be implemented in different ways, depending on whether the retaining element 120 is embedded in the adhesive interlayer 115 ([FIG. 3] for example) or is bonded in the peripheral recess 150 machined in said adhesive interlayer 115 ([FIG. 4] for example).

[FIG. 10] shows, in flowchart form, a particular method of implementing a method for manufacturing the glazed assembly 100 shown in [FIG. 3].

As illustrated in [FIG. 10], said manufacturing method comprises the steps of:

- assembling E10 the first and second structural plies 111, 113 to each other by means of the adhesive interlayer 115, so as to form said laminated glazing 110,
- assembling E20 the retaining element 120 with said laminated glazing 110, so that said first portion 121 is fixedly inserted in said adhesive interlayer 115 at the edge of the laminated glazing u110 and around its entire periphery, and said attachment part 122 extends the first portion 121 outside the laminated glazing 10,
- drilling E30 the laminated glazing 110 and the retaining element 120 to form said cavities 140,
- arranging E40 cleats 130 in said cavities 140.

More particularly, in the embodiment shown in [FIG. 10], the step E20 of assembling the retaining element 120 with the laminated glazing 110 is carried out during the implementation of the step E10 of assembling the first and second structural plies 111, 113 to each other, by embedding the first portion 121 of the retaining element 120 in the adhesive interlayer 115.

[FIG. 11] shows, in flowchart form, a particular method of implementing a method for manufacturing the glazed assembly 100 shown in [FIG. 4].

As illustrated in [FIG. 11], and in contrast to the implementation mode described with reference to [FIG. 10], the assembly step E20 of the retaining element 120 with the laminated glazing 110 is carried out here once the step E10 of assembling the first and second structural plies 111, 113 to each other has been completed.

Furthermore, said step E20 comprises, in this embodiment:

- machining E20_1 the peripheral recess 150 into the adhesive interlayer 115,
- gluing E20_2 the first portion 121 of the retaining element 120 into said peripheral recess 150.

It should be noted that in this embodiment, the retaining element 120 may advantageously be made from a plurality of parts, these different parts being fixed in the machined peripheral recess 150.

It is now described how said glazed assembly 100 is integrated into the aircraft by being fixed (that is fastened, secured) to its structure. For the sake of simplicity, this description refers only to the embodiment shown in [FIG. 3]. It will be obvious to those skilled in the art how this description can be adapted (if necessary) to other previously described embodiments.

As illustrated in [FIG. 3], the glazed assembly 100 is arranged so that:

- the first structural ply 111 is aerodynamically continuous with the aircraft envelope,
- the attachment part 122 of the retaining element 120 is bolted 190 to the internal structure of the aircraft.

More specifically, the attachment part 122 is fixed to a so-called "support" part 200 of the aircraft's internal structure. The said support part 200 is arranged opposite the edge of the laminated glazing 110, and extends, in this example, substantially parallel to the structural plies 111, 113. Furthermore, said attachment part 122 is arranged between the aircraft's outer shell and said support part 200, with bolting 190 being carried out from the outside to the inside of the aircraft.

As can be seen in [FIG. 3], the aerodynamic continuity of laminated glazing 110 with the aircraft envelope is achieved more specifically at a cover 210 of said envelope. Said cover 210 is separated from the laminated glazing 110 by an elastomer gasket 220 and is also attached to the internal structure of the aircraft by a bolt 230. Two further elastomer seals 240, 250 ensure contact between the cover 210 and the internal structure of the aircraft.

Alternatively, the cover 210 can be clipped or glued to the aircraft's internal structure.

Furthermore, two further elastomer seals 260, 270 ensure contact between the attachment part 122 and the support part 200 of the aircraft's internal structure.

It should be noted that, in the present embodiment, the glazed assembly 100 is attached to the aircraft structure, as described with reference to [FIG. 3], more specifically from the outside of said aircraft.

It is also important to note that this attachment represents only one particular embodiment of the invention, and still other embodiments can be envisaged.

Schematically, [FIG. 12] shows another particular way of attaching the glazed assembly 100 of [FIG. 3] to the aircraft structure.

In the example shown in [FIG. 12], said support part 200 is arranged at a distance from the second structural ply 113 towards the inside of the aircraft, and said attachment part 122 is arranged between the outer envelope of the aircraft (that is the cover 210 here) and said support part 200. Bolting 190 is carried out from the outside to the inside of the aircraft through a shim 280 positioned between the attachment part 122 and the support part 200. In addition, a contact element 290 made of a material more ductile than the glazing unit 110, such as aluminum or a hard polymer (for example, cotton-phenolic or nylon-acrylic composite), is inserted between the support part 200 and the second structural ply 113. An elastomer seal 300 ensures contact between the support part 200 and the second structural ply 113.

Similarly to [FIG. 3], the attachment of the glazed assembly 100 to the aircraft structure, as described with reference to [FIG. 12], is carried out more specifically from the outside of the aircraft.

Schematically, [FIG. 13] shows yet another particular way of attaching the glazed assembly 100 of [FIG. 3] to the aircraft structure.

In the example shown in [FIG. 13], said support part 200 is arranged between the aircraft envelope (that is the cover 210 here) and said attachment part 122. In addition, bolting 190 is carried out from the inside to the outside of the aircraft.

Thus, unlike FIGS. 3 and 11, the attachment of the glazed assembly 100 to the aircraft structure, as described with reference to [FIG. 13], is carried out more specifically from the inside of the aircraft.

So far, the invention has been described on the basis that the glazed assembly 100 forms part of the cockpit glazing of said aircraft. However, as already mentioned, this is not a limitation of the invention, which can also be applied to the case of a cabin glazing unit (porthole). A cabin glazing unit is typically double-glazed with two PMMA structural plies. These two structural plies are fastened together by a peripheral seal, typically made of silicone, which also controls the distance between the two structural plies. It follows from these provisions that the said peripheral seal acts, in this case, as an intermediate layer within the meaning of the invention, into which the retaining element 120 is inserted via its first portion 121.

The invention claimed is:

1. A glazed assembly for an aircraft, said glazed assembly comprising a laminated glazing comprising a set of structural plies including a first structural ply and a second structural ply fixed to the first structural ply by an interlayer, said glazed assembly further comprising:

a retaining element, a first portion of which is fixedly inserted in at least said interlayer at an edge of the laminated glazing and over at least a portion of its periphery, and a second portion of which extends the first portion outside of the laminated glazing, and a plurality of cleats arranged in respective cavities formed in the laminated glazing so that said cleats extend substantially perpendicularly across the first portion of the retaining element and into each of said structural plies.

2. The glazed assembly according to claim 1, wherein the retaining element is made of a metallic material or is made of a composite material.

3. The glazed assembly according to claim 1, wherein at least one cleat of the plurality of cleats is arranged in its associated cavity with clearance.

4. The glazed assembly according to claim 1, wherein said set of structural plies comprises at least three structural plies, an interlayer being arranged between each pair of structural plies.

5. The glazed assembly according to claim 1, wherein the structural plies have identical thicknesses, or at least two structural plies of the set of structural plies have different thicknesses.

6. The glazed assembly according to claim 1, wherein a glass sheet of a structural ply of the set of structural plies is made of mineral glass or polymer material.

7. The glazed assembly according to claim 1, wherein each interlayer is an adhesive layer made of thermoplastic polyurethane, polyvinyl butyral, ethylene- vinyl acetate copolymer, ionomer resin, or casting resin.

8. The glazed assembly according to claim 1, wherein the laminated glazing further comprises a glass sheet coated with a heating layer, that is in contact with the external environment and attached to the set of structural plies via an adhesive interlayer.

9. The glazed assembly according to claim 1, wherein the first portion of the retaining element is embedded in the interlayer via which the first structural ply is bonded to the second structural ply.

10. The glazed assembly according to claim 1, wherein the first portion of the retaining element is fixed by gluing in a peripheral recess machined in said interlayer, or in at least one of said first and second structural plies.

11. The glazed assembly according to claim 1, wherein glass sheets of the structural plies are made of polymeric material, the cavities being arranged in said glass sheets.

12. The glazed assembly according to claim 1, wherein glass sheets of the structural plies are made of mineral glass, each structural ply comprising:

a heel made of composite material and a shim made of flexible material, the heel and shim being arranged around an entire periphery of the glass sheet at its edge, said shim also being positioned between the glass sheet and the heel, inserts made of composite material, arranged on either side of the structural ply and fixed against the heel, the shim and part of the glass sheet, and wherein the cavities extend through the heels as well as the inserts, the retaining element being embedded in the interlayer via which the first structural ply is bonded to the second structural ply.

13. The glazed assembly according to claim 1, wherein the retaining element is configured to secure the laminated glazing unit to the aircraft.

14. The glazed assembly according to claim 1, wherein the second portion of the retaining element extending the first portion outside the laminated glazing is configured for attachment to an internal structure of the aircraft.

15. The glazed assembly according to claim 1, wherein at least one cleat of the plurality of cleats comprises a body made of a metallic material.

16. The glazed assembly according to claim 15, wherein at least one cleat of the plurality of cleats comprises a sleeve peripheral to said body and made of an elastic material.

17. The glazed assembly according to claim 1, wherein at least one cavity accommodating a cleat is entirely included in the laminated glazing, either opening through a single structural ply, or opening through all the structural plies.

18. The glazed assembly according to claim 17, wherein, when said at least one cavity is open through all the structural plies, the body of the cleat arranged in said at least one cavity is hollow.

19. A method for manufacturing a glazing unit according to claim 1, said method comprising:

assembling the structural plies to each other to form said laminated glazing, assembling the retaining element with said laminated glazing, so that said first portion is fixedly inserted in at least said interlayer by means of which the first structural ply is fixed to the second structural ply, at the edge of the laminated glazing as well as over at least a portion of its periphery, so that said second portion extends the first portion outside the laminated glazing, drilling the laminated glazing and the retaining element to form said cavities, and arranging said cleats in said cavities.

20. The method according to claim 19, wherein the assembling of the retaining element to the laminated glazing is carried out during the assembling of the first and second structural plies to each other, by embedding the first portion of the retaining element in the interlayer via which the first structural ply is attached to the second structural ply.

21. The method according to claim 19, wherein the assembling of the retaining element with the laminated glazing is carried out once the assembling of the first and second structural plies to each other has been completed, and comprises:

machining a peripheral recess in said interlayer, or even in at least one of said first and second structural plies, and bonding the first portion of the retaining element into said peripheral recess.

22. An aircraft comprising a glazed assembly according to claim 1 arranged in aerodynamic continuity with an envelope of said aircraft, the second portion of the retaining element, forming an attachment part, being fixed to an internal structure of the aircraft.

23. The aircraft according to claim 22, wherein the attachment part is fixed to a support part of the internal structure of the aircraft, said support part being arranged facing the edge of the laminated glazing, said attachment part being arranged between the envelope of the aircraft and said support part.

24. The aircraft according to claim 22, wherein the attachment part is fastened to a support part of the internal structure of the aircraft, said support part being arranged at a distance from the second structural ply towards an interior of the aircraft, said attachment part being arranged between the aircraft envelope and said support part, the attachment part being secured by a shim positioned between said attachment part and the support part, a contact element made of a material more ductile than glazing also being inserted between the support part and the second structural ply.

25. The aircraft according to claim 22, wherein the attachment part is fixed to a support part of the internal structure of the aircraft, said support part being arranged between the envelope of the aircraft and said attachment part.

* * * * *